United States Patent
Väänänen

(10) Patent No.: US 7,426,184 B2
(45) Date of Patent: Sep. 16, 2008

(54) METHOD AND APPARATUS FOR SCHEDULING AVAILABLE LINK BANDWIDTH BETWEEN PACKET-SWITCHED DATA FLOWS

(75) Inventor: Janne Väänänen, Espoo (FI)

(73) Assignee: Tellabs Oy, Espoo (FI)

( * ) Notice: Subject to any disclaimer, the term of this patent is extended or adjusted under 35 U.S.C. 154(b) by 857 days.

(21) Appl. No.: 10/694,178

(22) Filed: Oct. 28, 2003

(65) Prior Publication Data
US 2004/0085964 A1 May 6, 2004

(30) Foreign Application Priority Data
Oct. 29, 2002 (FI) .................... 20021921

(51) Int. Cl.
*H04L 12/56* (2006.01)
(52) U.S. Cl. .................. 370/235; 718/102
(58) Field of Classification Search ........ 370/428–429, 370/412–420, 230, 235, 395; 718/102
See application file for complete search history.

(56) References Cited

U.S. PATENT DOCUMENTS

| | | | | | |
|---|---|---|---|---|---|
| 5,828,878 | A | * | 10/1998 | Bennett | 718/102 |
| 5,956,340 | A | * | 9/1999 | Afek et al. | 370/412 |
| 6,504,819 | B2 | * | 1/2003 | Fowler et al. | 370/230 |
| 6,560,230 | B1 | * | 5/2003 | Li et al. | 370/395.42 |
| 6,895,012 | B2 | * | 5/2005 | Amou et al. | 370/395.4 |
| 6,937,566 | B1 | * | 8/2005 | Forslow | 370/231 |
| 6,950,397 | B1 | * | 9/2005 | Ho et al. | 370/235 |
| 6,977,930 | B1 | * | 12/2005 | Epps et al. | 370/392 |
| 7,027,457 | B1 | * | 4/2006 | Chiussi et al. | 370/414 |
| 7,116,663 | B2 | * | 10/2006 | Liao | 370/392 |
| 7,194,741 | B2 | * | 3/2007 | Tayyar et al. | 718/102 |
| 7,310,348 | B2 | * | 12/2007 | Trinh et al. | 370/428 |
| 2001/0026535 | A1 | | 10/2001 | Amou et al. | |
| 2001/0046208 | A1 | | 11/2001 | Eng et al. | |
| 2002/0044529 | A1 | | 4/2002 | Giroux et al. | |

FOREIGN PATENT DOCUMENTS

| | | |
|---|---|---|
| EP | 0981228 A2 | 2/2000 |
| WO | WO-01/74027 A1 | 4/2001 |

OTHER PUBLICATIONS

Computer Communications, vol. 24, No. 13, Elokuu 2001, Elsevier, J. Cha et al. pp. 1319-1328.

* cited by examiner

Primary Examiner—Thong H Vu
(74) Attorney, Agent, or Firm—Birch, Stewart, Kolasch & Birch, LLP

(57) ABSTRACT

The invention relates to a method and apparatus for scheduling transmission link bandwidth between packet-switched data flows so that a desired CoS (Class of Service) is provided with an ability to utilize the instantaneously available bandwidth of a data transmission network while simultaneously offering a guaranteed minimum data rate (Guaranteed Data Rate and Best Effort) without compromising the operation of such classes that have no guaranteed lower bound of data rate, but instead, have the service implemented by the utilization of the instantaneously available bandwidth (Best Effort). The invention is based utilizing in the scheduler control, not only the information indicating the class of service, but also the information indicating the subgroup inside a class of service (e.g., drop precedence). The information indicating the subgroup is conventionally utilized only for congestion control purposes.

18 Claims, 4 Drawing Sheets

Figure 1:
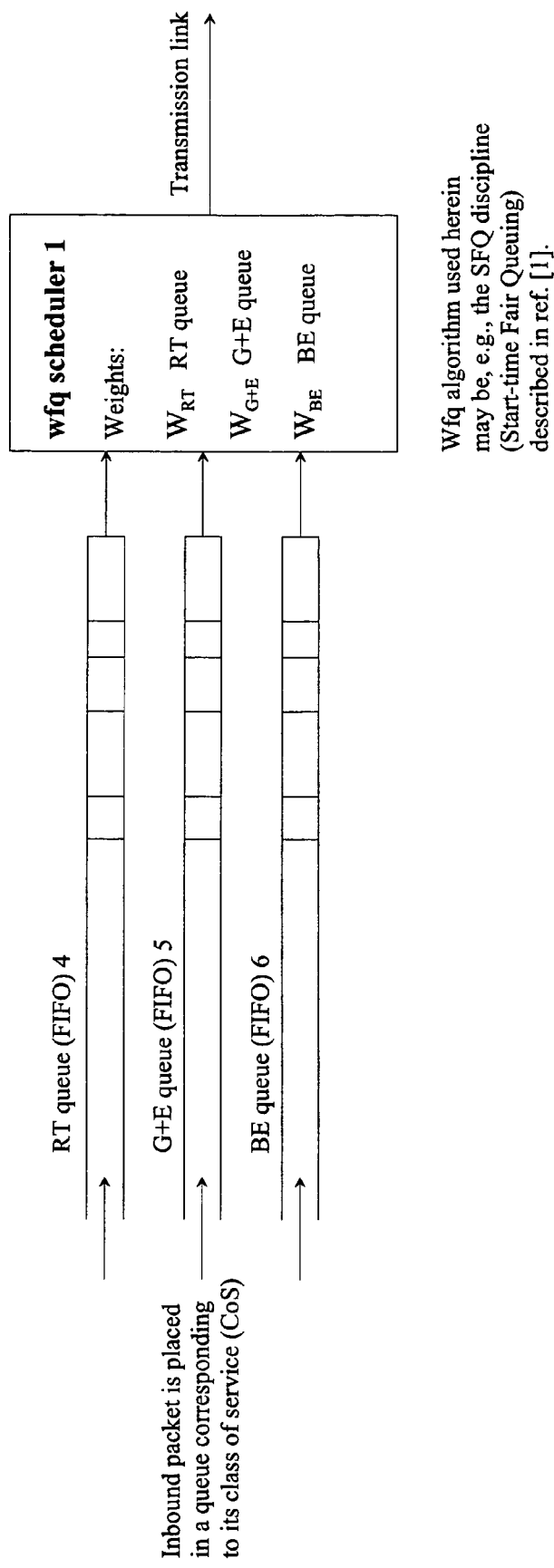

Wfq algorithm used herein may be, e.g., the SFQ discipline (Start-time Fair Queuing) described in ref. [1].

METHOD AND APPARATUS FOR SCHEDULING AVAILABLE LINK BANDWIDTH BETWEEN PACKET-SWITCHED DATA FLOWS

This nonprovisional application claims priority under 35 U.S.C. 119(a) on patent application Ser. No. 20021921 filed in FINLAND on Oct. 29, 2002, respectively, the entire contents of which is herein incorporated by reference.

The invention relates to a method according to claim 1 for scheduling available link bandwidth between packet-switched data flows.

The invention also relates to an apparatus according to claim 5 for scheduling available link bandwidth between packet-switched data flows.

In the following text elaborating both the prior art and the present invention, the following abbreviations will be used:

BE Class of service for applications that are allowed to utilize the instantaneously available bandwidth of a network but are not guaranteed to a minimum data rate nor an upper bound for packet transfer delay and delay jitter (Best Effort), CoS Class of Service, DSCP Packet header information indicating class of service of a packet (Differentiated Services Code Point), FIFO First In First Out queuing discipline, G+E Class of service for applications that are allowed to utilize the instantaneously available bandwidth of a network and are guaranteed to a minimum data rate but not to an upper bound for packet transfer delay and delay jitter (Guaranteed Rate and Best Effort), QoS Quality of Service, RT Class of service for applications for which the packet transfer delay and delay jitter is minimized and for which the minimum data rate is guaranteed but the applications cannot utilize the instantaneously available bandwidth of a network (Real Time), SFQ Start-time Fair Queuing, a weighted queuing discipline [1], wfq Weighted queuing discipline, the abbreviation being used as a generalized concept (weighted fair queuing), WFQ Weighted Fair Queuing, a specific weighted queuing discipline [1], WRED Weighted congestion avoidance algorithm [3, 4] (Weighted Random Early Detection).

In packet-switching networks, it is often advantageous to classify the data packets to be transferred into different classes of service (CoS) on one hand by the needs of various applications using the data network services and, on the other hand, by the QoS level agreements of a telecom service provider with his customers. In conjunction with a conventional telephone connection, for instance, it is essential that the bandwidth required by the application is available for predetermined time with a sufficiently low data transfer delay and delay jitter. In a telephone application, the user gains nothing from the possibility of having access to a temporarily higher link bandwidth in a low-load situation of the network. In contrast, during the download of a www page, for instance, it would be extremely advantageous to have access to the full temporarily available bandwidth of the network.

Next, a situation examined in which the telecom service provider offers the following classes of service:

RT (Real Time): service class for applications that are guaranteed to a minimum data rate and the packet transfer delay and delay jitter are minimized without any attempt to increase the instantaneous data rate offered to the given application even when the traffic load imposed on the communications network would momentarily happen to be at low level.

G+E (Guaranteed Rate and Best Effort): service class for applications guaranteed to a given minimum data rate and additionally offering all the instantaneously available bandwidth of the data transmission system to the use of the application. However, no commitments to guaranteed upper bounds of the packet transfer delay and delay jitter are given.

BE (Best Effort): service class for applications allocated to utilize the instantaneously available bandwidth of a network without any guaranteed minimum data transfer rate. Neither are commitments made as to any upper bounds given for the packet transfer delay and delay jitter.

FIG. 1 shows a conventional arrangement for scheduling the bandwidth of a common data transmission link between data flows representing the above-listed classes of service. The function of the system shown in FIG. 1 is as follows:

The class of service assigned to a given package is identifiable by header information carried in the packet (e.g., DSCP, Differentiated Services Code Point [2]).

The received packets are scheduled to respective class-of-service specific FIFO queues (RT, G+E and BE queues).

Each one of the packets categorized in class of service G+E is further assigned to an internal subgroup of the CoS allowing at least a decision to be made whether the packet is belonging to the portion of traffic committed to the guaranteed minimum data rate (hereinafter G portion) or to the portion of traffic exceeding the guaranteed minimum rate (hereinafter E portion). Assigning a packet to a given subgroup can be indicated, e.g., by the priority information (drop precedence) carried in the DSCP [2]. The subgroup information is utilized when a decision must be made at a case of queue congestion to which packets the actions of congestion control policy shall be applied. An example of this approach is the WRED (Weighted Random Early Detection) congestion control method [3, 4].

The link bandwidth is scheduled for data flows of the RT queue 1, the G+E queue 5 and the BE queue 6 using a weighted scheduling discipline (e.g., SFQ [1]) such that the weight ($W_{RT}$) of the RT queue 4 is selected so large in regard to the weights ($W_{G+E}$ and $W_{BE}$) of the G+E and BE queues that the traffic of the class RT under all conditions has access to the minimum bandwidth allocated thereto, while the weight of the G+E queue 5 is selected so large in regard to the weight of the BE 6 queue that the traffic of the class G+E under all conditions is granted to have access to the guaranteed minimum data rate.

Traffic of the class RT and the G portion of the class G+E are assumed to be bandwidth limited prior to the scheduler.

Figure 2:
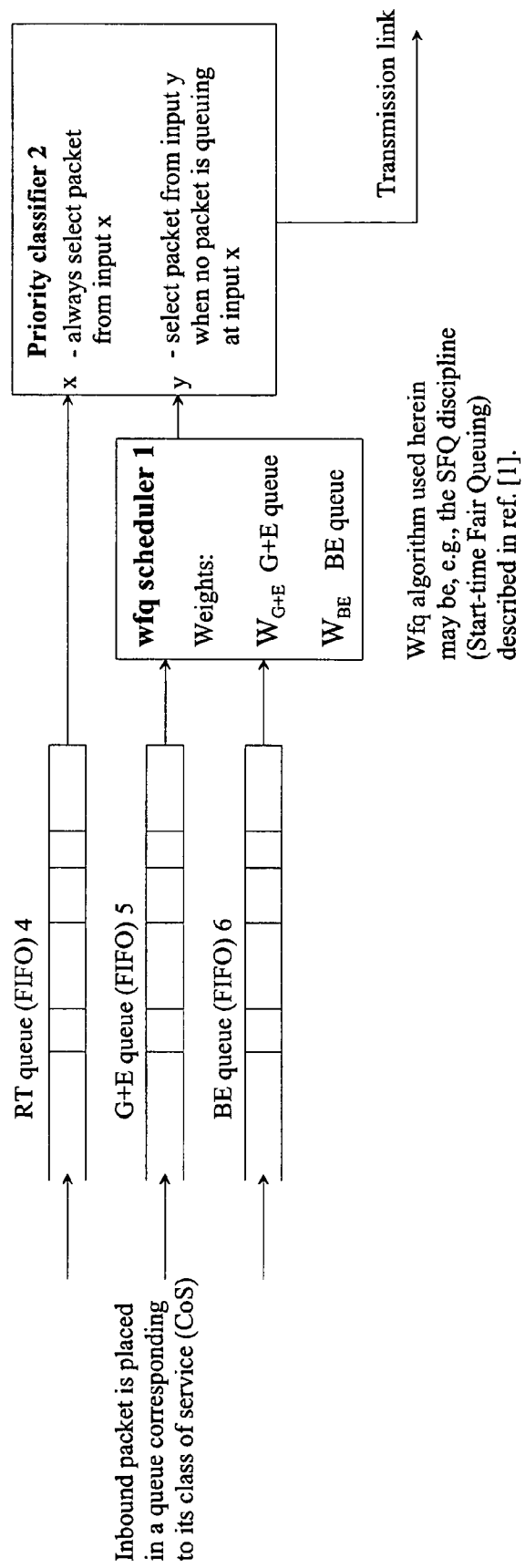

FIG. 2 shows another conventional arrangement for scheduling the bandwidth of a common link between data flows representing the above-listed classes of service. The function of the system shown in FIG. 2 differs from the function of the system shown in FIG. 1 by having the link bandwidth scheduled for the RT queue 4 at a priority before the G+E 5 and BE queues 6. The use of a priority scheduling discipline for the RT queue 4 is possible inasmuch as the traffic of the RT queue 4 is assumed to be bandwidth limited prior to entering the input port of the scheduler.

A problem in the scheduling arrangements shown in FIGS. 1 and 2 is that the traffic of class BE is contested in the scheduler by the traffic flow of the E portion in class G+E with weight $W_{G+E}$, whose value in regard to weight $W_{BE}$ of class BE is selected based on the guaranteed minimum data rate (guaranteed for the G portion) of class G+E. Resultingly, class BE has a poor capability of utilizing the instantaneously available bandwidth when also simultaneously the traffic flow of the E portion in class G+E attempts to utilize the same instantaneously free link bandwidth. This, however, is contrary to the basic idea of class BE traffic that guarantee no lower bound for the data transfer rate but instead provide the service user full access to the utilization of the instantaneously available bandwidth.

Figure 3:
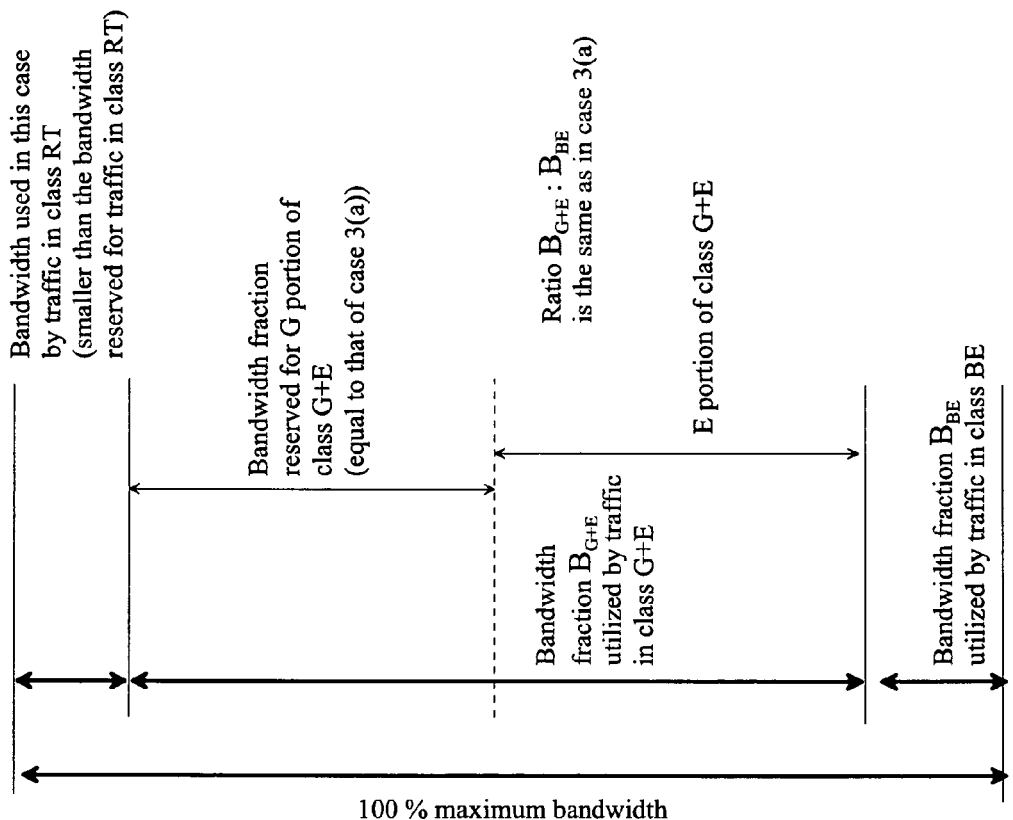
Figure 3:
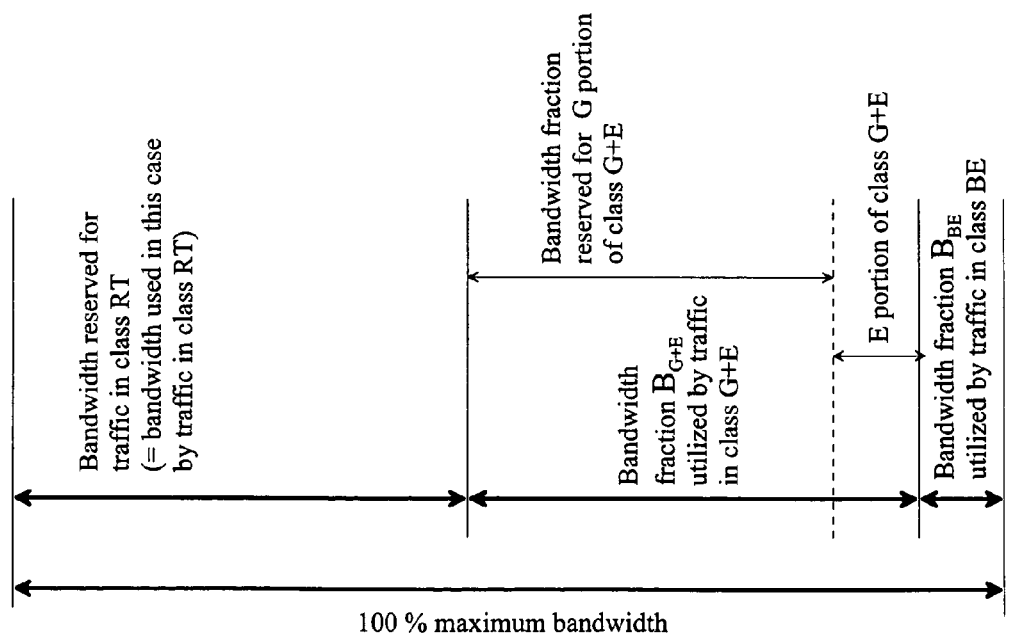

The situation is elucidated by exemplary cases (a) and (b) illustrated in FIG. 3. In the diagram, exemplary case (a) corresponds to bandwidth sharing between traffic flows of different classes of service when traffic from each class of service is transmitted in maximum possible amount. Herein, the ratio of bandwidth amount ($B_{G+E}$) used by the traffic of class G+E to the bandwidth amount ($B_{BE}$) used by class BE is $W_{G+E}/W_{BE}$. Exemplary case (b) corresponds to bandwidth sharing between data flows of different classes of service when the bandwidth reservations for both the traffic of class RT and the G portion of class G+E are the same as in exemplary case (a) with the exception that the fraction of bandwidth used by the traffic of class RT is less than the bandwidth reserved for the class, while the traffic of classes G+E and BE is transferred as much as possible. Also in this situation, the bandwidth utilization ratio is $B_{G+E}/B_{BE}=W_{G+E}/W_{BE}$. As is obvious from exemplary case (b), the fraction of bandwidth remaining unutilized by the traffic of class RT is given almost entirely to the E portion of class G+E.

It must be noted that, since the scheduler is not allowed to change the forwarding order of packets in the traffic flow of class G+E, the G and E portions of class G+E cannot be separated into different queues that could be given mutually independent scheduling weights.

It is an object of the present invention to overcome the drawbacks of the above-described prior art and to provide an entirely novel type of method and apparatus for scheduling the instantaneously available bandwidth between different packet-switched data flows. More particularly, the invention relates to a method capable of implementing a scheduler such that the instantaneously available bandwidth is allocated in a desired ratio (e.g., 1:1) between the traffic flows of E portion in class G+E and the traffic flow of class BE.

The goal of the invention is achieved by virtue of employing the subgroup information (e.g., drop precedence) in the operational control of a scheduler. In the prior art, subgroup information has only been used in a congestion control system (e.g., WRED). Yet, the scheduling method according to the invention does not exclude the use of subgroup (e.g., drop precedence) information in a congestion control system, too.

More specifically, the method according to the invention is characterized by what is stated in the characterizing part of claim 1.

Furthermore, the apparatus according to the invention is characterized by what is stated in the characterizing part of claim 5.

The invention offers a significant benefit over the prior art by way of allowing the scheduling engine to be implemented in such a fashion that the available residual bandwidth is allocated in a desired ratio (e.g., 1:1) between the data flow of the E portion in class G+E and the data flow of class BE. As a result, it becomes possible to provide a class of service (G+E) such that the instantaneously available bandwidth of a data transfer network can be utilized and, simultaneously, a guaranteed minimum data rate can be assured without compromising the quality of service in such classes (e.g., BE) that have no guaranteed lower bound of data transfer rate, but instead, have the service implemented by utilization of the instantaneously available bandwidth.

Figure 4:
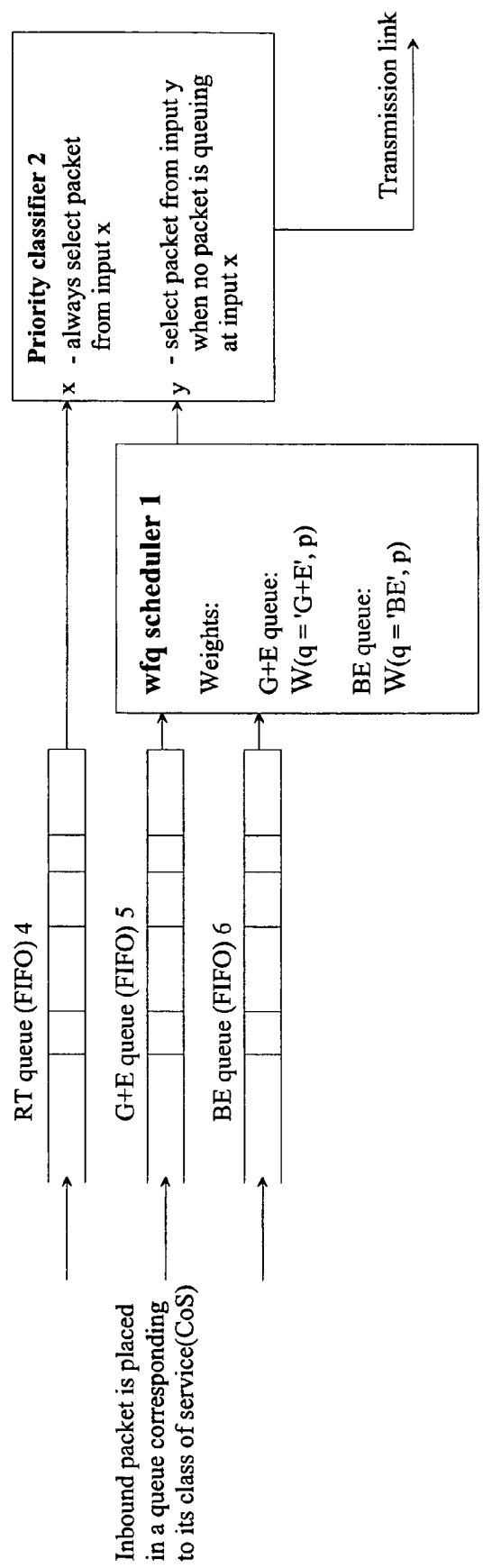

In the following, the invention is described in more detail with reference to exemplifying embodiments by making reference to the appended drawings in which FIG. 1 shows a block diagram of a prior-art system for scheduling the bandwidth of a common data transmission link for data flows of the above-discussed classes of service (RT, G+E, BE);

FIG. 2 shows a block diagram of another prior-art system for scheduling the bandwidth of a common data transmission link for data flows of the above-discussed classes of service; and FIG. 3 shows two exemplary cases (a) and (b) of the division of the instantaneously available bandwidth between the data flows of different classes of service. In exemplary case (a), the maximum amount of traffic per each class of service is transferred. In exemplary case (b), the fractions of bandwidth reserved for the class RT and the G portion of class G+E, respectively, are the same as those in exemplary case (a) but the bandwidth used by the traffic of class RT is less than the upper bound of bandwidth reserved for the class, while the traffic of classes G+E and BE is transferred at maximum bandwidth; and FIG. 4 shows a block diagram of a system according to the invention for scheduling the bandwidth of a common data transfer link between data flows of the above-discussed classes of service.

The theoretical basics of the method according to the invention are elucidated in the subsequent description.

In a weight-based scheduling method, the packets received at the input port of the scheduler are marked with a forwarding order indicator (e.g., Start_tag in the SFQ method [1]) telling the instant at which the packet is scheduled forward. Hence, the first packet to be forwarded is the one having an order indicator with a value indicating the earliest instant of forwarding. The transmission order indication need not be synchronized with the real time, but rather, it is sufficient to have the forwarding indicators of the packets in a correct transmission order in regard to each other.

In the generation of the forwarding order indicator for a packet received from a given class of service queue, the packet weight is assigned according to the respective class of service. If queue J1 has a higher weight than queue J2, the forwarding indicator sequence of successive packets of queue J1 in regard to the respective forwarding indicator sequence of queue J2 has such a character that queue J1 gains a larger fraction of scheduler output capacity.

In a priority-based sequencing method, a priority value is assigned to each one of the packets received at the scheduler 1 input port. The packets' priority values determine which one of the packets is to be forwarded next.

In the method according to the invention, however, the priority value assigned to a packet or, respectively, the weight applied to the generation of the packet's forwarding order indicator is dependent, not only on the class of service of the packet (hereinafter designated by symbol q), but also on the subgroup information (hereinafter designated by symbol p, such priority information being, e.g., packet drop precedence [2]) of the packet in question and/or of packets preceding or following the packet in question in the same class of service, FIG. 4. Inasmuch as the packets are contained by class of service specific queues in front of the sequencer 1, it is thus possible to know within the limits determined by the number of packets contained by the queue what kind of subgroup information is carried in the packets destined to enter the scheduler in the near future.

In the method according to the invention, an item or plural items of subgroup information may also determine whether the scheduling decisions concerning a given packet are made using a weight-based or a priority-based scheduling mechanism.

In contrast, prior-art systems employ subgroup information (p) for congestion control operations but not for scheduling.

Next, an embodiment of a scheduler according to the invention is described as to its scheduling function of the traffic flows of classes G+E and BE using an SFQ algorithm [1]. In the exemplary embodiment of the invention discussed herein, the packet-specific weight is selected on the basis of the subgroup whereto the packet under consideration belongs. The forwarding order indicators ($S_{G+E}(i)$ and $S_{BE}(j)$) Of packet i in class G+E and packet j in class BE, respectively, are computed as follows:

$$S_{G+E}(i)=\max\{v, S_{G+E}(i-1)+L(i-1)/W(q,p)\}, \quad (1)$$

$$S_{BE}(j)=\max\{v, S_{BE}(j-1)+L(j-1)/W(q,p)\}, \quad (2)$$

wherein L(i−1), L(j−1) are the packet sizes in bytes, for instance, variables p and q determine the value of weight W such that variable q is dependent on the class of service (G+E or BE) assigned to the packet (i or j) being examined and variable p is dependent on the subgroup assigned to the packet (i or j) being examined, and v is the forwarding order indicator (virtual time stamp) of the packet being transferred.

The value of the forwarding order indicator is computed when the packet is received at the class of service-specific input port of the scheduler and will not be updated later even if the value of v should change. Of the inbound packets, the first to be forwarded is the one (i or j) having the lower value of forwarding indicator.

In the exemplary case discussed herein is assumed that the subgroup-specific weights are selected as follows:

if packet of class G+E belongs to G portion, W(q='G+E', p='G')=$W_G$, if packet of class G+E belongs to E portion, W(q='G+E', p='E')=$W_E$, packets of class BE have the identical weights irrespective of the subgroup information, that is, W(q='BE'; p: irrelevant)=$W_{BE}$.

Hereinafter, a simple test or simulation is sufficient to verify the following fact: if over a given period of time the system transfers an average amount $W_G$ of the bytes (or bits) of G portion packets, then also over the period of time the system transfers an average amount $W_{BE}$ of the bytes (or bits) of class BE packets and, respectively, if over a given period of time the system transfers an average amount $W_E$ of bytes (or bits) of E portion packets, then also an average amount $W_{BE}$ of the bytes (or bits) of class BE packets are transferred. To further simplify the situation, it is possible to assume all packets to have an equal size, whereby the above-stated is true, not only for the bytes of packets, but also for complete packets.

By a suitable selection of values for weights $W_E$ and $W_{BE}$, a scheduling machine may be implemented so that the available bandwidth is allocated in a desired ratio between the data flow of the E portion in class G+E and the data flow of class BE.

An alternative embodiment of the above-described case can be realized by assigning weight $W_G$ an infinite value. In practice this means that packets of G portion are scheduled priority-based instead of using an SFQ discipline. Then, a packet received at the scheduler input port assigned for packets of subgroup G in class G+E queue is forwarded in prioritized fashion whatever the forwarding order indication of the packet queuing at the input port serving the data flow of class BE. This is feasible inasmuch as the traffic of the G portion in class G+E is assumed to be bandwidth limited.

REFERENCES

[1] Pawan Goyal, Harric M. Vin, Haichen Cheng. *Start-time Fair Queuing: A scheduling Algorithm for Integrated Services Packet Switching Networks*. Technical Report TR-96-02, Department of Computer Sciences, University of Texas, Austin, USA.

[2] Bruce Davie, Yakov Rekhter. *MPLS Technology and Applications*. Academic Press, 2000, CA, USA. (www.academicpress.com).

[3] Sally Floyd, Van Jacobson. *Random Early Detection Gateways for Congestion Avoidance*. Lawrence Berkeley Laboratory 1993, University of California, Calif., USA.

[4] White paper on WRED discipline retrievable at www address: http://www.juniper.net/techcenter/techpapers/20002 1-01.html.

What is claimed is:

1. A method for scheduling link bandwidth between different packet-switched data flows comprising:

classifying digital data packets of fixed or variable length into one of at least two classes of service wherein said classes of service represent a range of service levels between "real-time" and "best-effort" and each class of service is represented by at least one parallel FIFO (first-in-first-out) queue;

further classifying packets from at least one class of service into one of at least two internal subgroups within the at least one class of service; and scheduling available bandwidth of transmission links between class-of-service specific FIFO queues using a bandwidth scheduling discipline that ensures instantaneous availability of unutilized portions of bandwidth from all service classes to all effort-based service classes in a specific, consistent, configurable, ratio by assigning a priority value to a packet based on a combination of the packet's class of service and the subgroup information of the packet or at least one packet immediately preceding or following said packet.

2. The method of claim 1, said bandwidth scheduling discipline comprising at least one of a weight-based scheduling discipline, a priority-based scheduling discipline, or a combination of weight and priority-based scheduling disciplines.

3. The method of claim 2, further comprising selecting a weight-based or a priority-based scheduling discipline based on the subgroup whereto the packet in question belongs or on how inbound packets of the same class of service received at the scheduler input port preceding or following the packet in question are distributed between the subgroups.

4. The method of claim 2, said weight-based scheduling discipline comprising a SFQ (Start-time Fair Queuing) discipline.

5. The method of claim 2, said weight-based scheduling discipline comprising a WFQ (Weighted Fair Queuing) discipline.

6. The apparatus of claim 1, said subgroup information comprising drop precedence.

7. An apparatus for scheduling link bandwidth between different packet-switched data flows comprising:

a device for classifying digital data packets of fixed or variable length into one of at least two classes of service wherein said classes of service represent a range of service levels between "real-time" and "best-effort" and each class of service is represented by at least one parallel FIFO (first-in-first-out) queue;

a device for further classifying packets from at least one class of service into one of at least two internal subgroups within the at least one class of service; and a device for scheduling available bandwidth of transmission links between class-of-service specific FIFO queues using a bandwidth scheduling discipline that ensures instantaneous availability of unutilized portions of bandwidth from all service classes to all effort-based service classes in a specific, consistent, configurable, ratio by assigning a priority value to a packet based on a combination of the packet's class of service and the subgroup information of the packet and at least one packet immediately preceding or following said packet.

8. The apparatus of claim 7, said bandwidth scheduling discipline comprising at least one of a weight-based scheduling discipline, a priority-based scheduling discipline, or a combination of weight and priority-based scheduling disciplines.

9. The apparatus of claim 8, further comprising a device for choosing either a weight-based or a priority-based scheduling discipline based on the subgroup whereto the packet in question belongs or on how inbound packets of the same class of service received at the scheduler input port preceding or following the packet in question are distributed between the subgroups.

10. The apparatus of claim 8, further comprising a device for carrying out a weight-based scheduling discipline using a SFQ (Start-time Fair Queuing) discipline.

11. The apparatus of claim 8, further comprising a device for carrying out a weight-based scheduling discipline using a WFQ (Weighted Fair Queuing) discipline.

12. The method of claim 7, said subgroup information comprising drop precedence.

13. A computer readable medium having embodied thereon a program for scheduling link bandwidth between different packet-switched data flows which, when executed by a computer, performs the steps of:

classifying digital data packets of fixed or variable length into one of at least two classes of service wherein said classes of service represent a range of service levels between "real-time" and "best-effort" and each class of service is represented by at least one parallel FIFO (first-in-first-out) queue;

further classifying packets from at least one class of service into one of at least two internal subgroups within the at least one class of service; and scheduling available bandwidth of transmission links between class-of-service specific FIFO queues using a bandwidth schedule method that ensures instantaneous availability of unutilized portions of bandwidth from all service classes to all effort-based service classes in a specific, consistent, configurable, ratio by assigning a priority value to a packet based on a combination of the packet's class of service and the subgroup information of the packet and at least one packet immediately preceding or following said packet.

14. The program of claim 13, said bandwidth scheduling discipline comprising at least one of a weight-based scheduling discipline, a priority-based scheduling discipline, or a combination of weight and priority-based scheduling disciplines.

15. The program of claim 14, further comprising selecting a weight-based or a priority-based scheduling discipline based on the subgroup whereto the packet in question belongs or on how inbound packets of the same class of service received at the scheduler input port preceding or following the packet in question are distributed between the subgroups.

16. The program of claim 14, said weight-based scheduling discipline comprising a SFQ (Start-time Fair Queuing) discipline.

17. The program of claim 14, said weight-based scheduling discipline comprising a WFQ (Weighted Fair Queuing) discipline.

18. The computer readable medium of claim 13, said subgroup information comprising drop precedence.

* * * * *